Feb. 24, 1942. A. MONTENARE 2,274,375
REED FOR MUSICAL INSTRUMENTS
Filed March 7, 1941
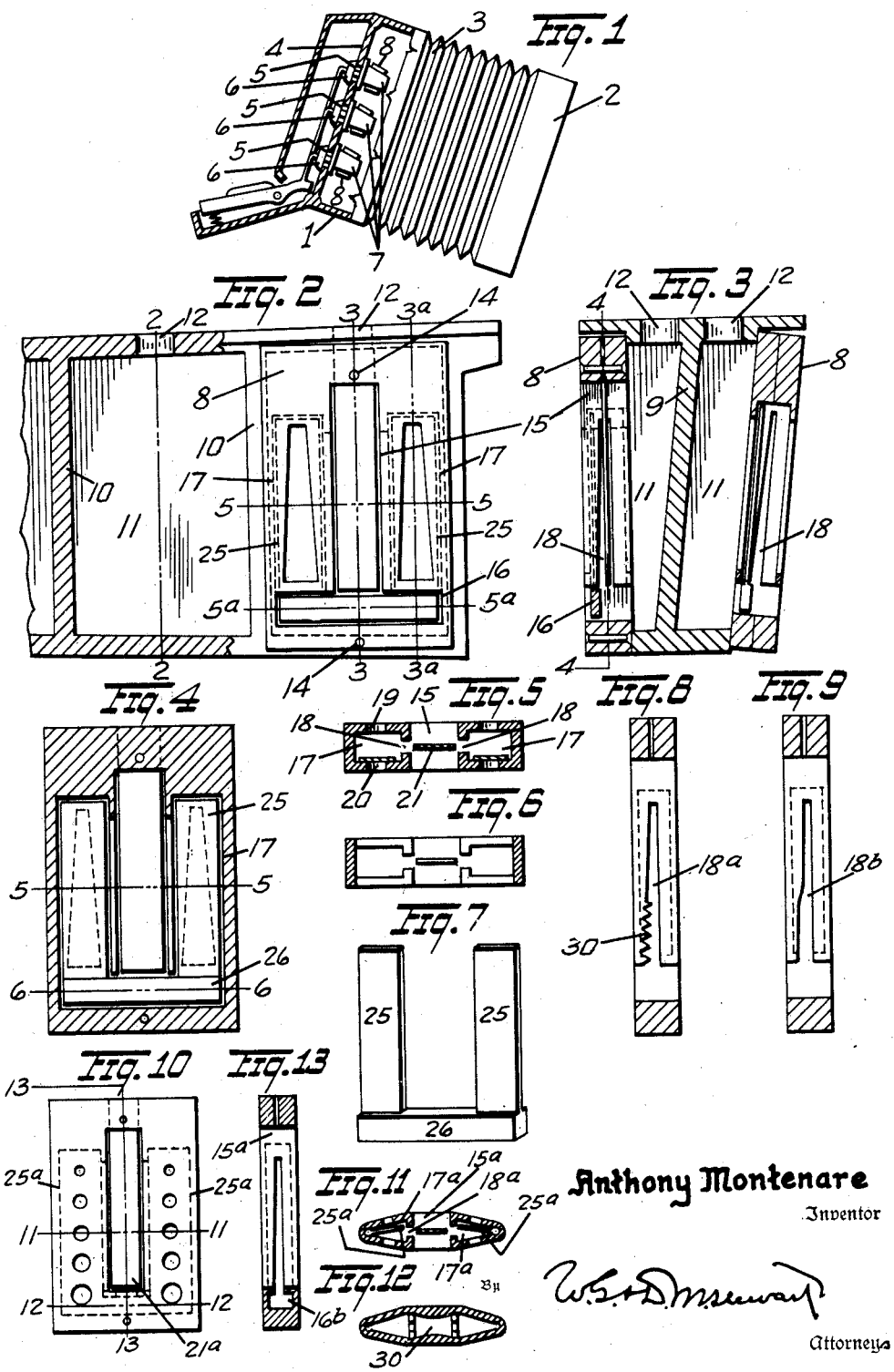
Anthony Montenare
Inventor Patented Feb. 24, 1942

2,274,375

UNITED STATES PATENT OFFICE 2,274,375

REED FOR MUSICAL INSTRUMENTS

Anthony Montenare, Reading, Pa.

Application March 7, 1941, Serial No. 382,110

8 Claims. (Cl. 84—375)

My invention relates to reeds employed in wind-operated musical instruments, and more particularly to improvements in reeds for this purpose of the single vibrating tongue type as fully shown and described in my prior Patent No. 1,985,102, granted to me December 18, 1934; my present object being to simplify its valve construction and enhance its tonal value and volume sound.

In reeds, as disclosed in my aforesaid patent, valves are essential to control and direct the wind passing therethrough, and it is also essential for tonal value and volume sound that the reeds have adequate internal sound enhancing or tonal chambers.

My present improvements therefore relate primarily to new and novel internal sound enhancing or tonal chambers of enlarged capacity having provision for greater flow of wind therethrough particularly adjacent the more effective free end of the vibratable tongue, and to simple double-acting chamber valves operated by and controlling the wind passing therethrough in either an intake or outflow direction induced by the opening and closing of a wind-supplying bellows.

My invention may be used in any wind instrument employing reeds to produce the musical sounds, but the nature of my improvements and the manner of their functioning are fully exemplified and will readily be understood in connection with the following detailed description and showing in the accompanying drawing, of its application to a usual known accordion instrument, and the novel features are set forth in the appended claims.

In the drawing:

Fig. 1 is a diagrammatic side elevational view, partly in vertical section, of a usual known accordion instrument embodying my invention.

Fig. 2 is a fragmentary plan view of a cell block, on an enlarged scale and partly in medial section, showing also a plan view of a reed embodying my improvements and mounted in operative position over the open-wall side of one of the cells in said block.

Fig. 3 is a corresponding cross sectional view of the cell block, taken on the line 2—2 of Fig. 2, also showing reeds mounted on opposite faces thereof, the reed to the left being shown in cross section on the line 3—3 of Fig. 2, and the reed to the right being shown in cross section on the line 3a—3a of Fig. 2.

Fig. 4 is a separate sectional plan view of the reed alone, taken on the line 4—4 of Fig. 3.

Fig. 5 is a transverse sectional view of the reed, taken on the line 5—5 of Fig. 2; and Fig. 6 is a corresponding sectional view taken on the line 5a—5a of Fig. 2.

Fig. 7 is a separate plan perspective view of the reed valve shown in Figs. 2 to 6.

Figs. 8 and 9 are similar cross-sectional views corresponding to the cross-sectional view of the reed seen to the left in Fig. 3, but omitting both the vibrating tongue and reed valve shown in the latter and respectively indicating variant shapes of a slotted opening connecting the tongue receiving aperture with the lateral tonal sound increasing chambers.

Fig. 10 shows in plan view a modified construction of my reed, and Figs. 11, 12 and 13 are cross sectional views thereof, taken respectively on the lines 11—11, 12—12, and 13—13 of Fig. 10.

The accordion indicated in Fig. 1, and in connection with which my improved reed is hereinafter described, consists of usual end frames 1 and 2, connected by a bellows 3, each frame ordinarily enclosing series of reeds with finger-operated external keys or buttons for controlling the same, the drawing indicating only those within the frame 1, shown in section for this purpose. The wall 4 of frame 1 is shown with apertures 5, each covered by a closure pad 6, controlled by a finger key as shown, and cell blocks 7 are shown mounted on the inner side of wall 4, each block carrying reeds 8, 8, mounted on opposed faces thereof. These cell blocks 7, as seen in Figs. 2 and 3, have longitudinal central partitions 9 and spaced cross partitions 10 dividing said cell blocks into outwardly opening opposed air cells 11, each covered by a reed 8 mounted thereon. Each air cell 11 is provided with a wall aperture 12, registering with its respective end wall aperture 5, and, as controlled by the key-lifted pads 6, opening of bellows 3, draws wind inwardly through registering apertures 5 and 12 into an air cell 11 and thence through its respective reed 8, and outwardly through a reed 8 into an air cell 11 and thence through apertures 12 and 5, when the bellows are closed, as usual in accordion instruments.

As before stated, my present improvements relate to the reeds 8, which, as mentioned, are of the single vibrating tongue type shown in my aforesaid patent, and while these reeds, for convenience and simplification of manufacture, are commonly made in half sections, united by pins or rivets 14, for simplification of description, I shall describe them as of unitary construction. And in the following specification I have used the word "reed" as a general term including the housing with its walls forming tongue and tonal apertures and the vibrating tongue.

Referring now particularly to Figs. 2 to 7, the reed 8 is shown of rectangular shape and of a size to fit over and tightly close the open-wall face of an air cell 11, to which it may be secured by a suitable plastic, wax, or cement; and it is preferably formed of a light metal, as aluminum or the like.

The reed 8, in the particular showing of Figs. 2 to 6, has walls forming a central longitudinal aperture 15, having a transverse T-head extension 16 at one end thereof, and lateral internal chambers 17, 17, spaced on opposite sides of said aperture 15, with one end of each chamber having a wall opening into extension 16. Each chamber 17, 17, has a longitudinal slot 18 in its wall adjacent the aperture 15; forming a communicating wind passage-way between said aperture and chamber, and similar top and bottom wall apertures, one thereof marked 19 forming a chamber communicating wind passage-way with the bellows chamber, and the other, 20, forming a chamber communicating wind passage-way with its reed cell 11. The single vibrating tongue 21 is held in the reed at one end, as by one of the rivets 14, and its free end projects longitudinally midway of the depth of aperture 15 and terminates just short of extension 16 of the latter. The construction so far described, follows in a general manner that shown and described in my aforesaid patent, except that the chambers 17, 17, are of enlarged capacity and novel construction, the purpose of which will later herein appear.

A particular departure from my reed as disclosed in the aforesaid patent, is the single U-shaped valve, shown separately in Fig. 7, preferably also made of light weight metal and having legs 25, 25, and a uniting portion 26; legs 25 and 25 projecting into the lateral chambers 17, 17, and portion 26 fitted to move vertically within extension aperture 16. Depending upon the direction of wind passing through the reed, valve legs 25, 25, will be moved within their chambers 17, 17 to close either the chamber apertures 19, 19, or 20, 20, and valve portion 26 simultaneously shifted to a position within extension 16 either above or below the free end of tongue 21.

A reed formed as above described, not only has but a single dual-acting vibrating tongue 21, but also a single dual-acting valve, as shown, acting to direct the wind passing inwardly or outwardly through cell 11, so as to effect a better tonal value and volume of sound produced by the vibrating reed.

The chambers 17, 17, as described not only may have a larger capacity than those shown in my aforesaid patent, but in addition have the increased capacity of the transverse aperture 16 to increase their tonal value and volume sound, and the novel U-shaped valve is not only enclosed within the reed chambers out of danger of displacement or damage, but singly effects control of the passing wind through both chambers 17, 17, and extension 16 with which latter both chambers 17, 17, have free end wind communication as before stated.

I have found that further improvements in tonal value and volume sound may be secured by novel shape of the longitudinal wall slots 18, 18, forming communicating wind passage-ways between the chambers 17, 17, and tongue aperture 15. As seen to the left in Fig. 3, these slots are preferably of a tapered or irregular width shape, with their wider ends adjacent the more effective sound producing free end of tongue 21. In Fig. 8, I have shown the tapered slot 18a, as having a further increased wind passage provided by a serrated edge 30 formed in the lower end of one wall, such serrated edge lying in the opposed wall of the spaced slot communicating with the opposed lateral chamber. Fig. 9, shows a further modification of the slot 18b, having merely a curved enlargement at its wider end. The opposed-wall chamber apertures 19 and 20, are also shown as preferably tapered with their wider portions adjacent the free end of tongue 21, but they need not necessarily be so shaped, or have a continuous outline, and may be readily made of a series of apertures, and in Fig. 10, I have shown them as a series of round apertures increasing in diameter toward the free end of tongue 21a.

Figs. 10 to 13, show further possible modifications of a reed embodying my improvements, the cells 17a, 17a having a tapered cross-sectional shape with their wider portions adjacent the wall slots 18a, 18a, forming wind communicating passage-ways with tongue aperture 15a, and their ends opening into a transverse internal connecting chamber 16b, communicating midway thereof with aperture 15a through a wall aperture 30. This aperture 30 may be made of varying outline, but preferably is wider at its ends with a reduced intermediate portion, as shown in Fig. 12. The valve legs 25a, 25a, in this modification, do not require the connecting cross member 26, and each leg is shown in Fig. 11, as pivotally secured along one longitudinal edge thereof in a suitable bearing formed in the apex side of its respective chamber 17a, so that said valves will pivotally swing instead of moving bodily. They exemplify a single valve controlling the wind flow through each chamber 17a, 17a.

In the above modified construction, it may at times be desirable to employ a cross valve member in the transverse connecting chamber 16b, and this may readily be done by forming such valve member as a separate part, disconnected from the leg members 25a, 25a, such disconnected portion coacting and moving jointly with said leg members as actuated by the wind respirations. And it is obvious that cross member 26 in Fig. 7 may be made as a separate and independent part from the leg members 25, 25, and as such independent part it will equally coact with said legs as they are reversely moved by the wind respirations.

The essential common novelty of the several forms of reed above fully described, is that the single dual-acting tongue, vibratingly mounted as heretofore, produces an improved and cleaner toned sound of increased volume, due to the large lateral chambers and their end connecting transverse wind passage-way, still further improved by the enlarged size of the chamber apertures adjacent the more violently vibrated free end of the reed tongue. And the novel valve shown, either in the U-shape or as separated leg portions, lies advantageously within the reed chambers and effectively controls wind respirations either inwardly or outwardly through said reed.

As before stated, my reeds are not necessarily limited to accordion instruments, but may be applied to other wind instruments relying on reeds for their musical sounds, and it is not to be understood as limited to the specific construction above described, but is intended to include modifications and changes within the scope of the appended claims.

What I claim is:

1. A reed for wind instruments comprising a housing having walls forming a tongue aperture and a separate tonal aperture both opening through opposite faces of said housing; said tongue aperture having a reed tongue mounted to vibrate therein by wind passing therethrough in either direction; said tonal aperture having an enlarged intermediate chamber portion and a lateral wall opening from the latter communicating with said tongue aperture; and a single flat freely-movable valve in said chamber portion adapted to be operated by wind entering the latter in either direction to direct wind discharge therefrom through said lateral wall opening into said tongue aperture.

2. A reed for wind instruments comprising a housing having walls forming a tongue aperture and a tonal aperture extending in spaced relation on opposite sides of said tongue aperture and both apertures opening through opposite faces of said housing; said tongue aperture having a reed tongue mounted to vibrate therein by wind passing therethrough in either direction; said tonal aperture having enlarged intermediate chamber portions on each side of said tongue aperture and lateral wall openings therefrom communicating with said tongue aperture; and a valve having extensions into the respective chamber portions and adapted to be jointly operated by wind entering the latter in either direction to direct wind discharge therefrom through said lateral wall openings into said tongue aperture.

3. A reed for wind instruments comprising a housing having walls forming a tongue aperture and a separate tonal aperture extending around one end of said tongue aperture and both apertures opening through opposite faces of said housing; said tongue aperture having a reed tongue mounted to vibrate therein by wind passing therethrough in either direction; said tonal aperture having enlarged intermediate chamber portions on each side of said tongue aperture and lateral wall openings therefrom communicating with said tongue aperture; and a valve having spaced extensions projecting into the respective chamber portions and adapted to be operated by wind entering the latter in either direction to direct wind discharge therefrom through said lateral wall openings into said tongue aperture.

4. A reed for wind instruments comprising a housing having walls forming a tongue aperture provided with a transverse extension at one end thereof and a separate tonal aperture having portions thereof on opposite sides of said tongue aperture, both apertures opening through opposite faces of said housing; said tongue aperture having a reed tongue mounted to vibrate therein by wind passing therethrough in either direction; said tonal aperture having enlarged intermediate chamber portions on each side of said tongue chamber and lateral wall openings therefrom communicating respectively with said tongue aperture and the transverse extension of the latter; and a U-shaped valve having its connecting base portion mounted in said transverse tongue aperture extension and its parallel legs extending into said chamber portions and adapted to be operated by wind entering the latter in either direction to direct wind discharge therefrom through said lateral wall openings into said tongue aperture and the transverse extension of the latter.

5. In a reed comprising a housing having walls forming a reed tongue aperture extending through opposite faces of said housing and a separate tonal chamber having wall openings through opposite faces of said housing and a lateral wall opening into said tongue aperture, said wall openings having irregular widths with their wider portions adjacent one end of said tongue aperture.

6. In a reed comprising a housing having walls forming a reed tongue aperture extending through opposite faces of said housing and a separate tonal chamber having wall openings through opposite faces of said housing and a lateral wall opening into said tongue aperture, said lateral wall opening having an irregular width with its wider portion adjacent one end of said reed tongue aperture.

7. In combination with a musical instrument having an air cell and means for producing wind movement therethrough in reverse directions, a reed housing mounted over said cell to form a wall closure therefor and having walls forming a reed tongue aperture opening through opposite faces of said housing and a tonal chamber having separate wall openings through opposite faces of said housing and a lateral wall opening connecting said tonal chamber and said tongue chamber, a reed tongue mounted to vibrate in said tongue aperture by wind passing therethrough in either direction, and a single flat freely-movable valve in said tonal chamber adapted to be operated by wind entering the latter in either direction to direct wind discharge therefrom through said lateral wall opening into said reed tongue aperture.

8. In combination with a musical instrument having an air cell and means for producing wind movement therethrough in reverse directions, a reed housing mounted over said cell to form a wall closure therefor and having walls forming a reed tongue aperture opening through opposite faces of said housing and a tonal chamber spacedly encircling an end portion of said tongue aperture and having separate wall opening through opposite faces of said housing and lateral wall openings connecting said tonal chamber and said tongue aperture, a reed mounted to vibrate in said tongue aperture by wind passing therethrough in either direction, and a U-shaped valve in said tonal chamber adapted to be operated by wind entering the latter in one direction to direct wind discharge therefrom through its said lateral wall openings.

ANTHONY MONTENARE.